United States Patent

Chen et al.

[11] Patent Number: 5,804,778
[45] Date of Patent: Sep. 8, 1998

[54] ELEVATOR CONTROL DATA INTERCOMMUNICATION PROGRAMMER

[75] Inventors: Ching-Mau Chen, Taipei Hsien; Tzu-Yuan Lin, I Lan; Chin-Chang Wu, Changhua Hsien; Liao-Chia Chang, Keellung; Hsin-San Chang, Taipei Hsien; Wen-Wei Chuang, Taipei, all of Taiwan

[73] Assignee: Yungtay Engineering Co., Ltd., Taipei, Taiwan

[21] Appl. No.: 774,928

[22] Filed: Dec. 27, 1996

[51] Int. Cl.⁶ .............................. B66B 1/28; G05B 15/00
[52] U.S. Cl. ............................................. 187/248; 187/247
[58] Field of Search .................................... 187/247, 248

[56] References Cited

U.S. PATENT DOCUMENTS

| | | | |
|---|---|---|---|
| 4,567,560 | 1/1986 | Polis et al. | 364/184 |
| 4,999,768 | 3/1991 | Hirokawa | 364/200 |
| 5,266,891 | 11/1993 | Kumar et al. | 324/158 |
| 5,297,260 | 3/1994 | Kametani | 395/325 |
| 5,616,894 | 4/1997 | Nieminen et al. | 187/247 |

FOREIGN PATENT DOCUMENTS

| | | | |
|---|---|---|---|
| 4-49181 | 2/1992 | Japan | 187/248 |
| 5-8959 | 1/1993 | Japan | 187/248 |

*Primary Examiner*—Robert Nappi
*Attorney, Agent, or Firm*—Bacon & Thomas

[57] ABSTRACT

An elevator control data intercommunication programmer including a main board equipped with master and slave CPUs for controlling the operation of the elevator, EEPROMs for providing operation data to the CPUs, a DSP for controlling vector operation of the elevator's motor, and a data communication port for data communication with an external microprocessor unit. Through the data communication port, data can be programmed in the EEPROMs, so that the elevator operation data (parameters) in the memory of a failed CPU can be copied to another CPU for replacement.

2 Claims, 4 Drawing Sheets

ELEVATOR CONTROL DATA INTERCOMMUNICATION PROGRAMMER

BACKGROUND OF THE INVENTION

The present invention relates to an elevator control data intercommunication programmer, and more particularly to such a programmer which makes the maintenance, adjustment, data storage, data processing and file management of elevators easy.

Nowadays, regular elevators are commonly driven by an alternating induction motor through the control of a computer control. Therefore, the specification design and variation are relatively sophisticated. In order to meet different floor parameters (number of floors, height of building) and different customer requirements (continuous door open time), a standard program is pre-stored in the system memory of the PC board when an elevator is fabricated at factory, then parameter adjustment and test run are done in-situ after the elevator has been installed. This method is used in an elevator control device, in which the elevator operation parameters (data) are stored in a RAM (random access memory) convenient for modification. The elevator operation parameters include function parameters and building conditions. In order to meet different purposes and different requirements, the items of parameters are greatly increased. For example, the elevator landing parameter may include cage-called door open time, floor-called door open time, light extension time, minimum accelerating distance, car stop setting, etc. The number of elevator operation parameters may include several hundred items. Therefore, when an elevator is installed and its test-run is finished, the engineer must record the set parameters, or read out the set parameters from computer for further maintenance reference. Because most control unit abnormalities are caused by malfunction of peripheral elements but not due to an abnormality of the memory data (the aforesaid parameters), subscribers usually will inform the elevator manufacturer to repair the elevator when it is unable to work normally. The maintenance procedure is as follows:

1. The maintenance engineer reaches the job site and finds the aforesaid PC board abnormal, then informs his service department of the model of the elevator and the related informations including motor parameters, building height, door switching time, etc.;
2. The maintenance department picks up the data of the PC board of the model concerned from the file, and informs the factory to manufacture a new PC board;
3. The factory manufactures a new PC board as requested, and then sends the new PC board to the maintenance department;
4. The maintenance department informs the maintenance engineer to carry the new PC board to the job site and to make a replacement; and
5. The parameters are adjusted, and thus the maintenance work is finished.

The aforesaid procedure takes about 2–3 days. This length of time is reasonable. However, the elevator users may still complain about low working efficiency of the elevator supplier.

There is known a different maintenance procedure which uses a compatible main board (PC board) to replace the abnormal PC board, and the designated parameters are programmed in the compatible main board by a portable computer or by hand before its installation. This method is more efficient, however it still takes about 2 days to finish. Even if the maintenance engineer carries a standard main board (PC board), he may not have the original set data of the elevator. Therefore, the maintenance engineer shall have to read out the internal data of the elevator by a computer, and then program the data in the memory of the new PC board. In short, conventional maintenance methods are time consuming and low efficient.

SUMMARY OF THE INVENTION

The main object of the present invention is to provide an elevator control data intercommunication programmer which greatly improves the working efficiency at job site and simplifies the maintenance procedure, so that the elevator maintenance job can be completed within about 4–6 minutes. The data in the memory of the original main board can be programmed in another main board through the programmer. Therefore, when the main board of the control panel of an elevator fails, the maintenance engineer can quickly program the data of the failed PC board into a standard PC board for a replacement. Because no further parameter adjustment is needed, the maintenance work can be done within 4–6 minutes. Because the present invention enables the memories of different main boards to be inter-programmable, the data of the main board of one elevator in a building can be programmed into the main board of another, so that the installation of elevations in a building can be quickly done.

DETAILED DESCRIPTION OF THE PREFERRED EMBODIMENT

Figure 1:
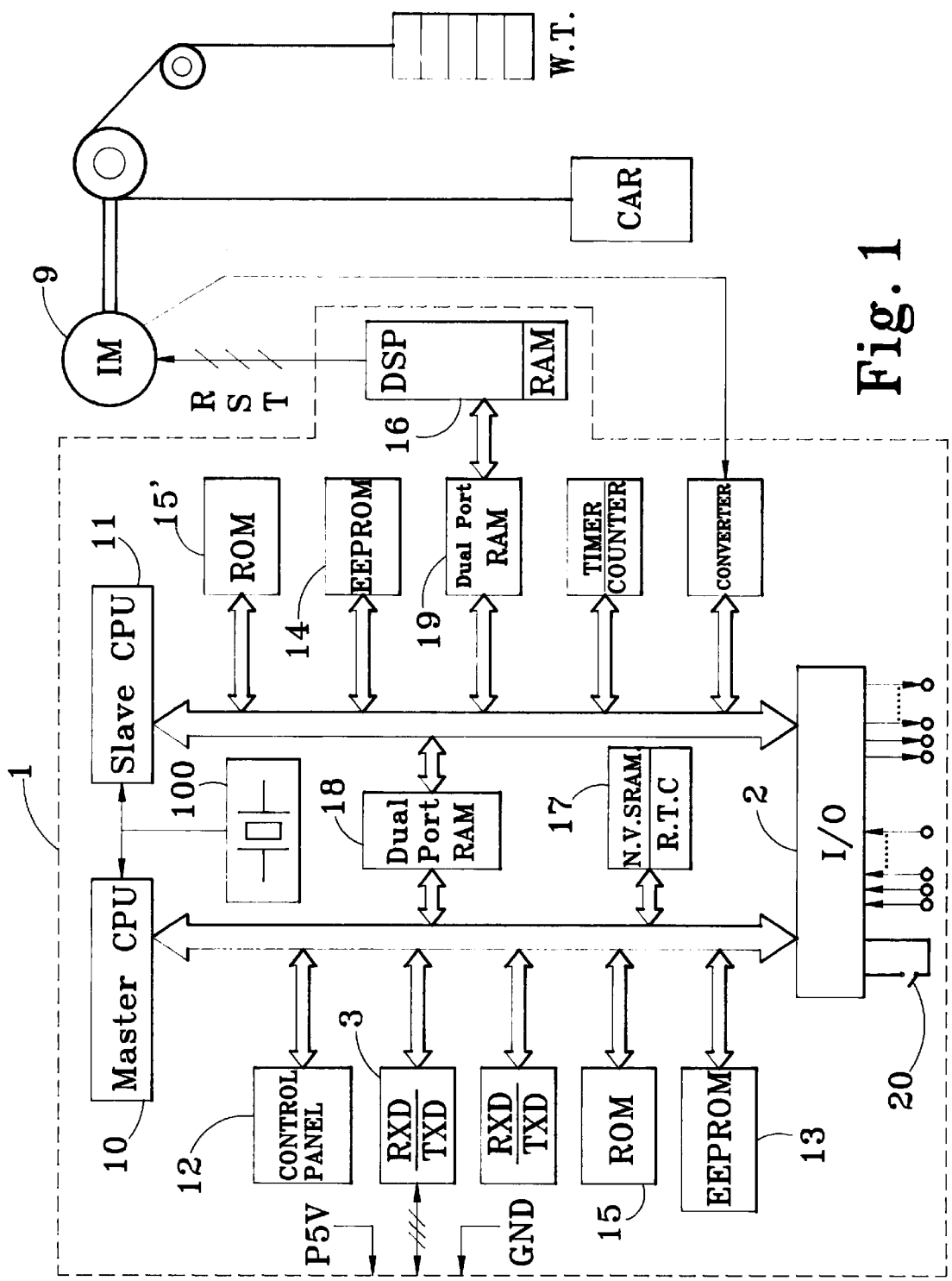
FIG. 1 is a system block diagram of a main board according to the present invention.

Referring to FIG. 1, the main board 1 comprises a master CPU 10, a slave CPU 11, a control panel 12, a master EEPROM (electrically erasable programmable read only memory) 13, a slave EEPROM 14, ROMs 15 and 15' for improving access of elevator control program, a DSP 16 for controlling vector operation of an induction motor 9, a N.V.SRAM (nonvolatile timekeeping random access memory) 17, an I/O interface 2, a data communication port 3, and a dual port RAM 18. The master CPU 10 is for elevator operation control, location detection, switch door control. The main program to be executed by the master CPU 10 is stored in the aforesaid ROM 15. The slave CPU 11 is for elevator speed control, location detection, processing of rotary encoder speed feedback signal. Because the CPUs 10 and 11 share the job, the operation speed is relatively increased. Further, the oscillating signal for the CPUs 10 and 11 and the oscillating signal for the DSP 16 come from the same synchronizing oscillating signal source 100.

The related elevator operation data are respectively stored in the EEPROMs 13 and 14 subject to the functions of the CPUs 10 and 11. The data of the DSP 16 is stored in the EEPROM 14 for further transmission through the dual port RAM 19. The memory of the N.V.SPRAM 17 is effective for operation for as long as 15 years without the need of changing the external battery. Further, the N.V.SPRAM 17 comprises a real time clock (R.T.C), an oscillator, a power fail control circuit, and a lithium energy.

The aforesaid data communication port 3 is adapted for receiving a RS-232 interface, so that two mainframe circuit boards 1 and 1' can be connected together (see FIGS. 2 and 3), or an external computer can be connected to the data communication port 3 through its RS-232 interface for data transmission and transfer-programming (this will be described further). The aforesaid I/O interface 2 comprises door open detector contact, door close detector contact, fire sensor contact and floor sensor contact for elevator control, and a latch 20 for enabling communication for permitting the maintenance engineer to transmit (write in) data.

Figure 2:
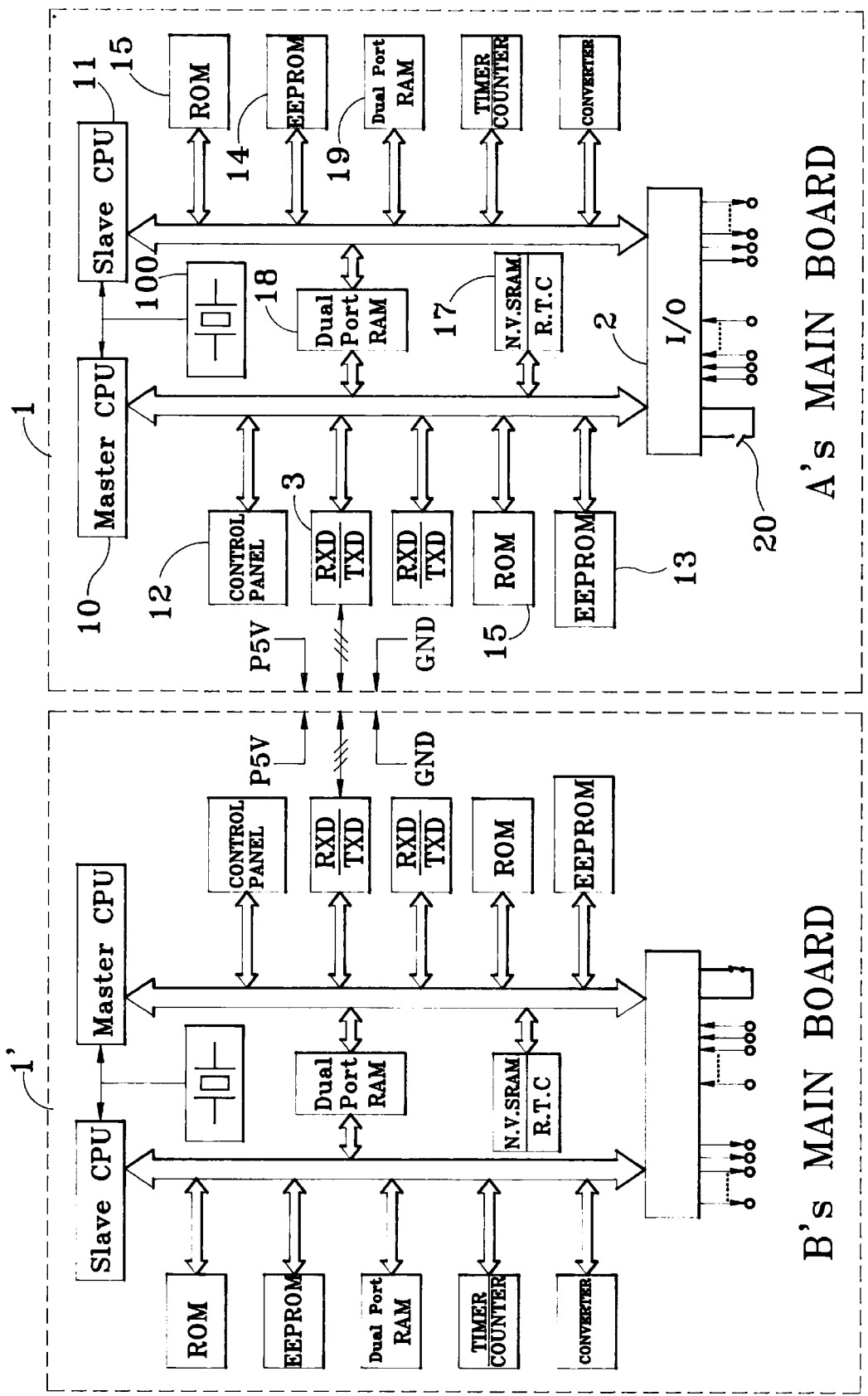
FIG. 2 is an application block diagram showing data transfer-programming between two main boards according to the present invention.
Figure 5:
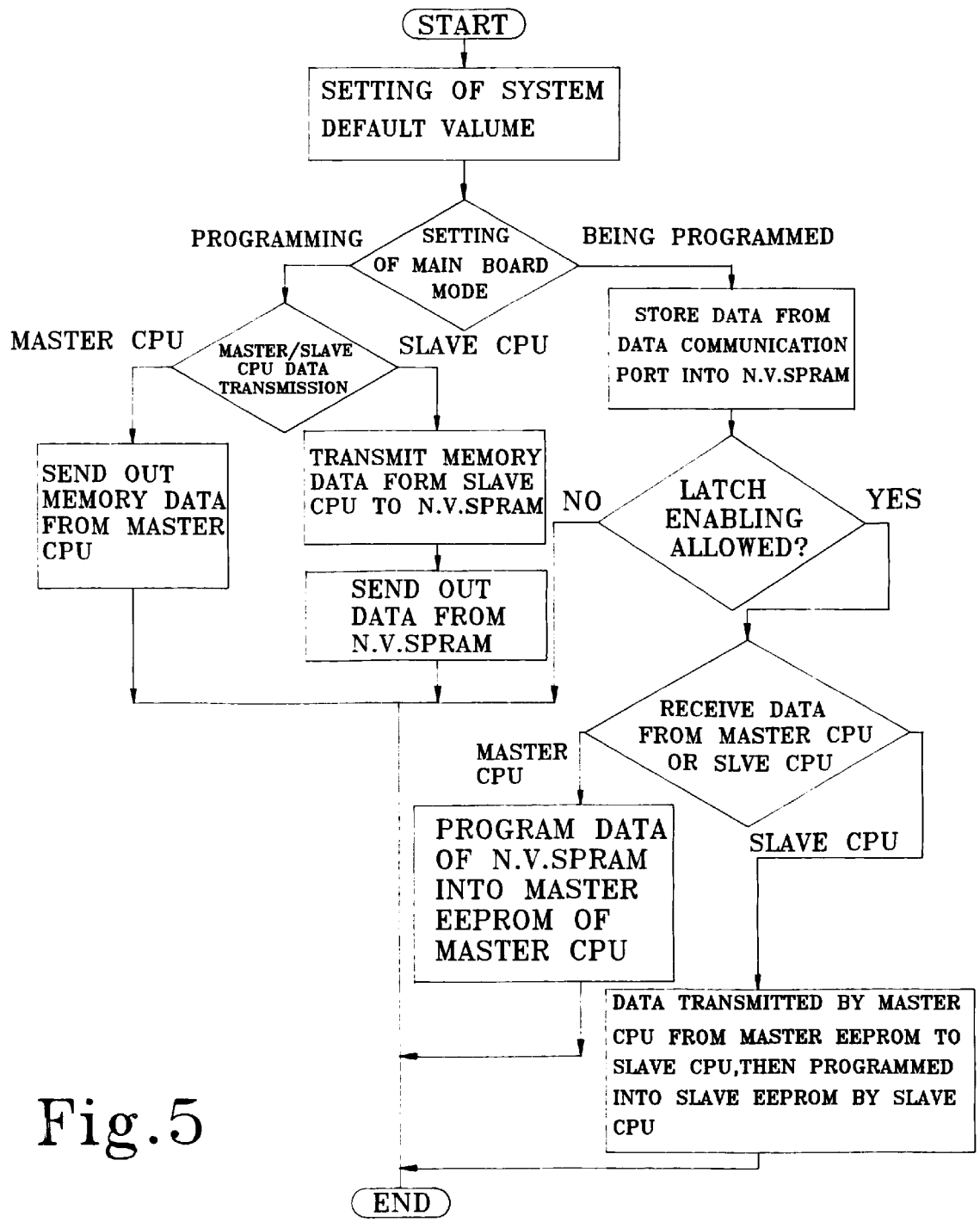
FIG. 5 is a program flow chart of the data transmission device according to the present invention.

Referring to FIGS. 2 and 5, when the program is started, the system default value (such as Baud rate) is set, then the main board 1 is set into the mode of programming or being programmed, and then the transmitting data is judged from the master EEPROM 13 of the master CPU 10 or the slave EEPROM 14 of the slave CPU 11. These settings can be achieved through the control panel 12 by means of an interactive communication. The data transmission methods include four types subject to the type of the data to be transmitted. These methods are as outlined hereinafter.

1. When the data to be transmitted comes from the master CPU 10, the data of the master EEPROM 13 is directly sent out through the aforesaid data communication port 3. In order to prevent a data transmission error, the complements of D and D are simultaneously sent out, the receiving terminal calculate these two data through a XOR logic operation, and the data is written in if the result is zero, on the contrary, the writing is given up and the abnormality is detected if the result is not zero.

2. When the data to be transmitted comes from the slave CPU 11, the data of the slave EEPROM 14 is registered in the N.V.SPRAM 17 through the dual port RAM 18, and then sent out through the data communication port 3.

3. When to program data into the master CPU 10, the data is read into the N.V.SPRAM 17, then the latch 20 is enabled, and then the data is written in the master EEPROM 13.

3. When to program data into the slave CPU 11, the data is read into the N.V.SPRAM 17, then the master CPU 10 is controlled to send the data to the dual port RAM 18, and then the latch 20 is enabled, and then the data is written in the slave EEPROM 14.

Figure 3:
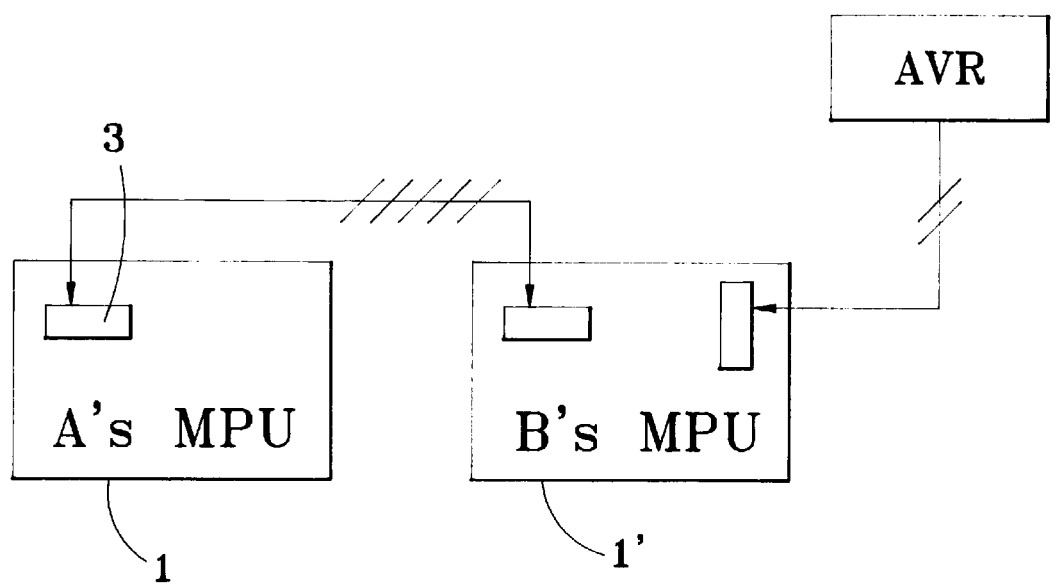
FIG. 3 shows the electric wiring of the arrangement of FIG. 2.
Figure 4:
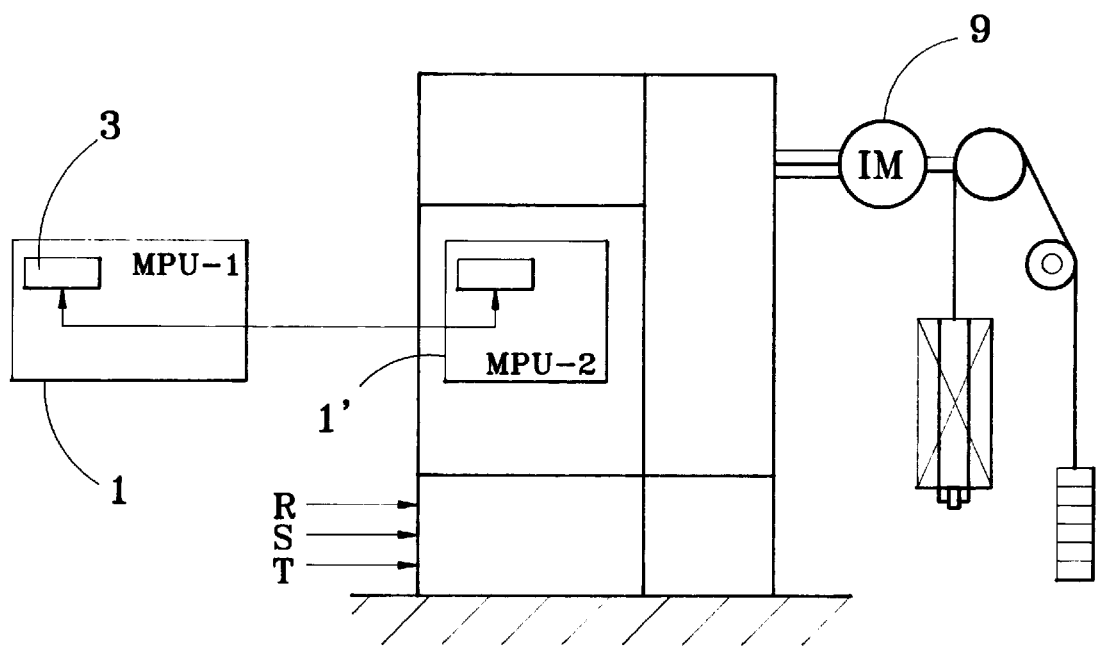
FIG. 4 shows the application of the present invention at the maintenance job site.

FIGS. 3 and 4 are transfer programming circuit diagrams according to the present invention. In FIG. 3, AVR is a +5 V DC power supply; the main board 1 at A side firstly transmits data to the main board 1' at B side, then the latch of the main board 1' at B side is enabled for the transmission of data. When the main board 1' at B side has received a data, the data is recognized, and then the correct information is sent back to the main board 1 at A side for confirmation so that a next data is allowed to be transmitted. FIG. 4 is similar to FIG. 3, however the main board 1' at B side is at the elevator.

As indicated above, when the elevator fails and the main board 1 is to be replaced, the maintenance engineer needs only to carry a standard main board 1' and to communicate the standard main board 1' with the main board 1 for programming. This job can be done within about 4–6 minutes.

I claim:

1. An elevator control data intercommunication programmer comprising a main board installed in an elevator, said main board comprising:

a master CPU and a slave CPU for controlling the operation of the elevator;

a master EEPROM (electrically erasable programmable read only memory) for providing operation data to said master CPU;

a slave EEPROM (electrically erasable programmable read only memory) for providing operation data to said slave CPU;

read only memory means for storage of an elevator control program;

a DSP for controlling vector operation of an induction motor of the elevator, said DSP being able to access data from said slave EEPROM through a dual port RAM (random access memory) for operation;

an oscillating signal source for providing an oscillating signal to said master CPU, said slave CPU and said DSP;

a control panel for default value and mode setting;

a dual port RAM (random access memory) for data communication between said master CPU and said slave CPU;

a data communication port for data communication with an external microprocessor unit; and a N.V.SRAM (nonvolatile timekeeping random access memory) for storage of data read from said data communication port or data to be transmitted.

2. The elevator control data intercommunication programmer of claim 1 wherein said main board further comprises a latch for enabling programming.

* * * * *